(12) United States Patent
Austerberry

(10) Patent No.: US 10,683,158 B2
(45) Date of Patent: Jun. 16, 2020

(54) PROTECTIVELY FRAMED AND COVERED THERMAL INSULATION PANEL

(71) Applicant: PELICAN BIOTHERMAL, LLC, Plymouth, MN (US)

(72) Inventor: Sean James Austerberry, Leighton Buzzard (GB)

(73) Assignee: Pelican Biothermal, LLC, Plymouth, MN (US)

( * ) Notice: Subject to any disclaimer, the term of this patent is extended or adjusted under 35 U.S.C. 154(b) by 0 days.

(21) Appl. No.: 15/416,542

(22) Filed: Jan. 26, 2017

(65) Prior Publication Data

US 2018/0208388 A1 Jul. 26, 2018

(51) Int. Cl.
| | | |
|---|---|---|
| *E04C 2/34* | (2006.01) | |
| *B65D 81/38* | (2006.01) | |
| *F16L 59/065* | (2006.01) | |
| *E04C 2/284* | (2006.01) | |
| *E04C 2/38* | (2006.01) | |
| *B65D 81/05* | (2006.01) | |
| *B65D 81/20* | (2006.01) | |

(52) U.S. Cl.
CPC ....... *B65D 81/3816* (2013.01); *B65D 81/053* (2013.01); *B65D 81/20* (2013.01); *E04C 2/284* (2013.01); *E04C 2/384* (2013.01); *F16L 59/065* (2013.01)

(58) Field of Classification Search
CPC ... B65D 81/3816; B65D 81/20; B65D 81/053
USPC ...... 52/793.1, 784.15, 309.5, 309.9
See application file for complete search history.

(56) References Cited

U.S. PATENT DOCUMENTS

| | | | |
|---|---|---|---|
| 2,240,487 A | 4/1940 | Benham | |
| 2,496,296 A | 11/1945 | Lobl | |
| 2,781,643 A | 1/1953 | Fairweather | |
| 3,070,257 A | 5/1961 | Bajanowski | |
| 3,077,426 A | 2/1963 | Johnston | |
| 3,262,283 A | 7/1966 | Taylor | |
| 3,334,464 A * | 8/1967 | Charles | E06B 3/7015 49/501 |
| 3,786,613 A | 1/1974 | Shepheard | |
| 3,810,367 A | 5/1974 | Peterson | |
| 3,974,658 A | 8/1976 | Starret | |
| 3,979,869 A * | 9/1976 | Beehler | E06B 3/7003 29/402.06 |

(Continued)

FOREIGN PATENT DOCUMENTS

| | | |
|---|---|---|
| DE | 19915311 A1 | 4/1999 |
| DE | 10305550 A1 | 8/2004 |

(Continued)

OTHER PUBLICATIONS

Verner, Carl. "Phase Change Thermal Energy Storage". Dissertation. May 1997.

*Primary Examiner* — Basil S Katcheves
(74) *Attorney, Agent, or Firm* — Sherrill Law Offices, PLLC

(57) ABSTRACT

A protectively enclosed panel of frangible thermal insulation having a panel of frangible thermal insulation with C-channel binding bars fitted over each edge of the panel and wear protective cover sheets covering the first and second major surface of the panel with the peripheral margin of the cover sheets adhered to the C-channel binding bars.

14 Claims, 4 Drawing Sheets

(56) References Cited

U.S. PATENT DOCUMENTS

| | | | |
|---|---|---|---|
| 3,987,588 A * | 10/1976 | Imperial | E06B 3/88 |
| | | | 49/501 |
| 4,044,449 A | 8/1977 | Phan | |
| 4,145,895 A | 3/1979 | Hjetstrand et al. | |
| 4,147,004 A | 4/1979 | Day et al. | |
| 4,319,629 A | 3/1982 | Hotta | |
| 4,324,111 A | 4/1982 | Edwards | |
| 4,373,633 A | 2/1983 | Lutz, Sr. | |
| 4,438,611 A * | 3/1984 | Bryant | E04D 3/3602 |
| | | | 52/309.2 |
| 4,463,043 A * | 7/1984 | Reeves | B32B 27/08 |
| | | | 428/119 |
| 4,502,260 A * | 3/1985 | Machler | A47G 1/10 |
| | | | 160/369 |
| 4,527,370 A | 7/1985 | Schuette | |
| 4,529,638 A | 7/1985 | Yamamoto et al. | |
| 4,589,240 A | 5/1986 | Kendall et al. | |
| 4,688,398 A | 8/1987 | Baek | |
| 4,808,457 A | 2/1989 | Kruck et al. | |
| 4,892,226 A | 1/1990 | Abtahi | |
| 4,908,248 A | 3/1990 | Nakashima et al. | |
| 4,923,077 A | 5/1990 | Van Iperen et al. | |
| 4,931,333 A | 6/1990 | Henry | |
| 5,007,226 A | 4/1991 | Nelson | |
| 5,032,439 A | 7/1991 | Glicksman et al. | |
| 5,048,233 A * | 9/1991 | Gidseg | E06B 3/78 |
| | | | 126/198 |
| 5,050,387 A | 9/1991 | Bruce | |
| 5,088,301 A | 2/1992 | Piepenbrink | |
| 5,093,175 A | 3/1992 | Goto et al. | |
| 5,273,801 A | 12/1993 | Barry et al. | |
| 5,361,603 A | 11/1994 | Merritt-Munson | |
| 5,435,142 A | 7/1995 | Silber | |
| 5,582,343 A | 12/1996 | Dalvey | |
| 5,669,233 A | 9/1997 | Cook et al. | |
| 5,683,799 A | 11/1997 | Olinger | |
| 5,756,179 A | 5/1998 | Jutte | |
| 5,758,513 A | 6/1998 | Smith | |
| 5,848,508 A | 12/1998 | Albrecht | |
| 5,870,868 A * | 2/1999 | Kita | E04C 2/384 |
| | | | 312/140 |
| 5,875,599 A | 3/1999 | McGrath et al. | |
| 5,897,932 A * | 4/1999 | McGarth | E04B 1/803 |
| | | | 220/592.27 |
| 5,899,088 A | 5/1999 | Purdum | |
| 5,924,302 A | 7/1999 | Derifield | |
| 6,164,030 A | 12/2000 | Dietrich | |
| 6,168,040 B1 | 1/2001 | Sautner et al. | |
| 6,209,343 B1 | 3/2001 | Owen | |
| 6,223,551 B1 | 5/2001 | Mitchell | |
| 6,233,965 B1 | 5/2001 | Choy | |
| 6,250,104 B1 | 6/2001 | Bostic | |
| 6,325,281 B1 | 12/2001 | Grogan | |
| 6,457,323 B1 | 10/2002 | Marrota | |
| 6,467,323 B1 | 10/2002 | Narushima et al. | |
| 6,474,095 B1 | 11/2002 | Chan | |
| 6,502,417 B2 | 1/2003 | Gano, III | |
| 6,658,857 B1 | 12/2003 | George | |
| 6,718,776 B2 | 4/2004 | Wessling et al. | |
| 6,875,486 B2 | 4/2005 | Miller | |
| 7,294,374 B2 | 11/2007 | Romero | |
| 7,721,566 B1 | 5/2010 | Wilken | |
| 7,950,246 B1 | 5/2011 | Mayer et al. | |
| 8,117,792 B2 | 2/2012 | Kim et al. | |
| 8,348,087 B2 | 1/2013 | Sawaki | |
| 9,016,030 B1 * | 4/2015 | Steele | E06B 3/726 |
| | | | 52/784.11 |
| 2002/0050147 A1 | 5/2002 | Mai et al. | |
| 2002/0114937 A1 | 8/2002 | Albert et al. | |
| 2002/0134962 A1 | 9/2002 | Romero | |
| 2002/0144482 A1 | 10/2002 | Henson et al. | |
| 2003/0082357 A1 | 5/2003 | Gokay et al. | |
| 2003/0128898 A1 | 7/2003 | Malone et al. | |
| 2003/0194525 A1 * | 10/2003 | Pereira | E04B 1/7662 |
| | | | 428/43 |
| 2004/0018335 A1 | 1/2004 | Best | |
| 2004/0025528 A1 | 2/2004 | Gano, III | |
| 2004/0069789 A1 | 4/2004 | Ohno et al. | |
| 2004/0074208 A1 | 4/2004 | Olson et al. | |
| 2004/0079794 A1 | 4/2004 | Mayer | |
| 2004/0087979 A1 | 4/2004 | Mayer | |
| 2004/0180176 A1 | 9/2004 | Rusek, Jr. | |
| 2004/0226309 A1 | 11/2004 | Broussard | |
| 2005/0053755 A1 | 3/2005 | Markey | |
| 2005/0189404 A1 | 9/2005 | Xiaohai et al. | |
| 2006/0076863 A1 | 4/2006 | Echigoya et al. | |
| 2006/0168985 A1 | 8/2006 | Gano | |
| 2006/0277938 A1 | 12/2006 | Meyer et al. | |
| 2007/0119108 A1 | 5/2007 | Downard | |
| 2007/0175236 A1 | 8/2007 | Dryzun | |
| 2007/0186577 A1 | 8/2007 | Goncharko | |
| 2007/0289976 A1 | 12/2007 | Meyer et al. | |
| 2009/0039088 A1 | 2/2009 | Williams et al. | |
| 2009/0065514 A1 | 3/2009 | Vovan | |
| 2009/0078708 A1 | 3/2009 | Williams | |
| 2009/0230138 A1 | 9/2009 | Williams et al. | |
| 2010/0301057 A1 | 12/2010 | Tattam et al. | |
| 2010/0314397 A1 | 12/2010 | Williams et al. | |
| 2010/0326993 A1 | 12/2010 | Mayer et al. | |
| 2011/0147391 A1 | 6/2011 | Corder et al. | |
| 2011/0248038 A1 * | 10/2011 | Mayer | B65D 81/382 |
| | | | 220/592.27 |
| 2011/0277489 A1 * | 11/2011 | Schalla | A47B 31/02 |
| | | | 62/89 |
| 2011/0284556 A1 | 11/2011 | Palmer et al. | |
| 2014/0260933 A1 | 9/2014 | Ardiff et al. | |

FOREIGN PATENT DOCUMENTS

| | | |
|---|---|---|
| EP | 1099646 A1 | 5/1999 |
| EP | 1069048 A1 | 1/2001 |
| EP | 2022728 A1 | 8/2007 |
| FR | 2194615 A2 | 3/1974 |
| FR | 2948342 A1 | 1/2011 |
| GB | 2293160 A | 3/1996 |
| GB | 2459392 A | 10/2009 |
| JP | 2000274589 A | 10/2000 |
| WO | 9324797 | 12/1993 |
| WO | 9922190 | 5/1999 |
| WO | 9932374 | 7/1999 |
| WO | 0299345 A1 | 12/2002 |
| WO | 0386269 A1 | 10/2003 |
| WO | 2005036076 A1 | 4/2005 |
| WO | 2006031189 A1 | 3/2006 |
| WO | 2006082433 A1 | 8/2006 |
| WO | 2008137883 A1 | 11/2008 |
| WO | 2010055295 A1 | 5/2010 |
| WO | 2010123726 A1 | 11/2010 |
| WO | 2010139769 A1 | 12/2010 |

\* cited by examiner

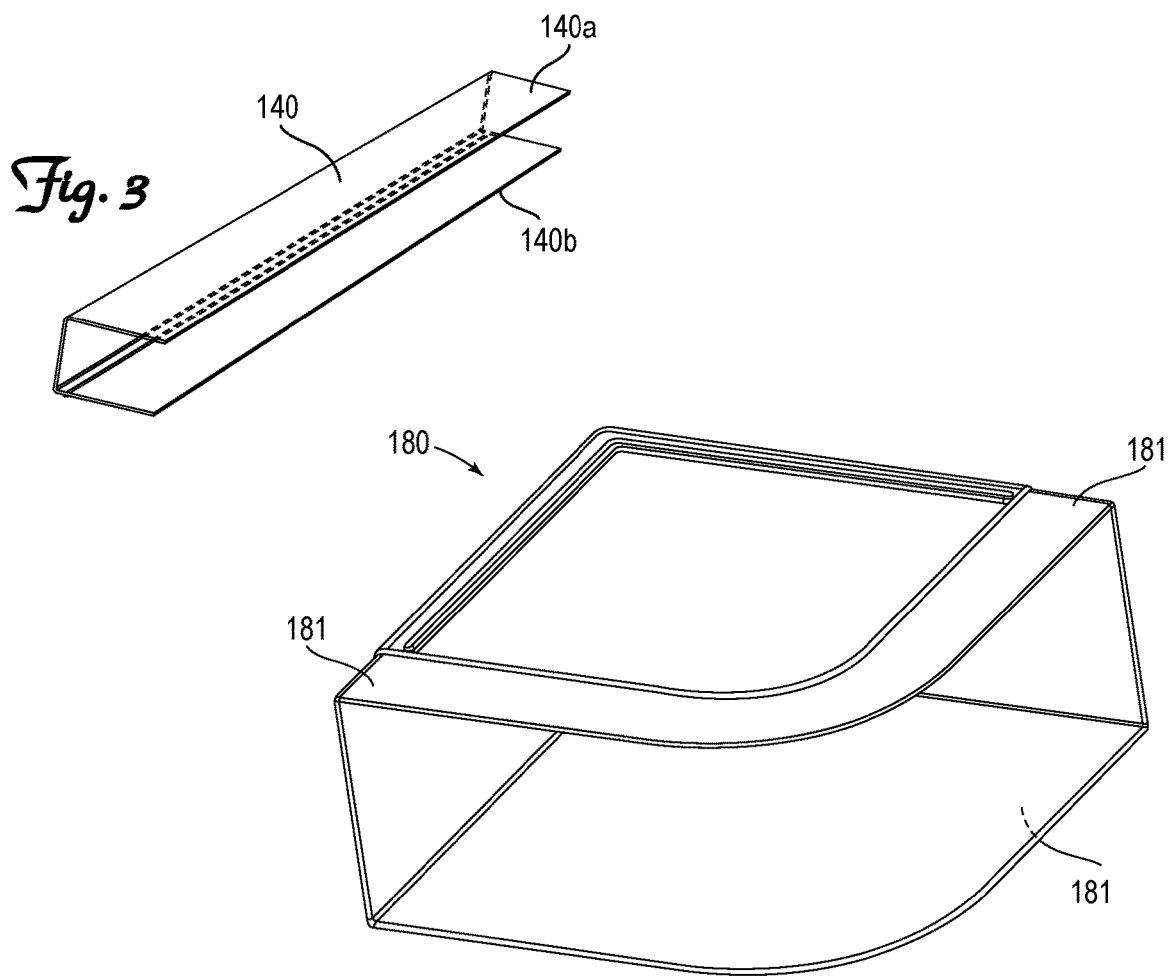
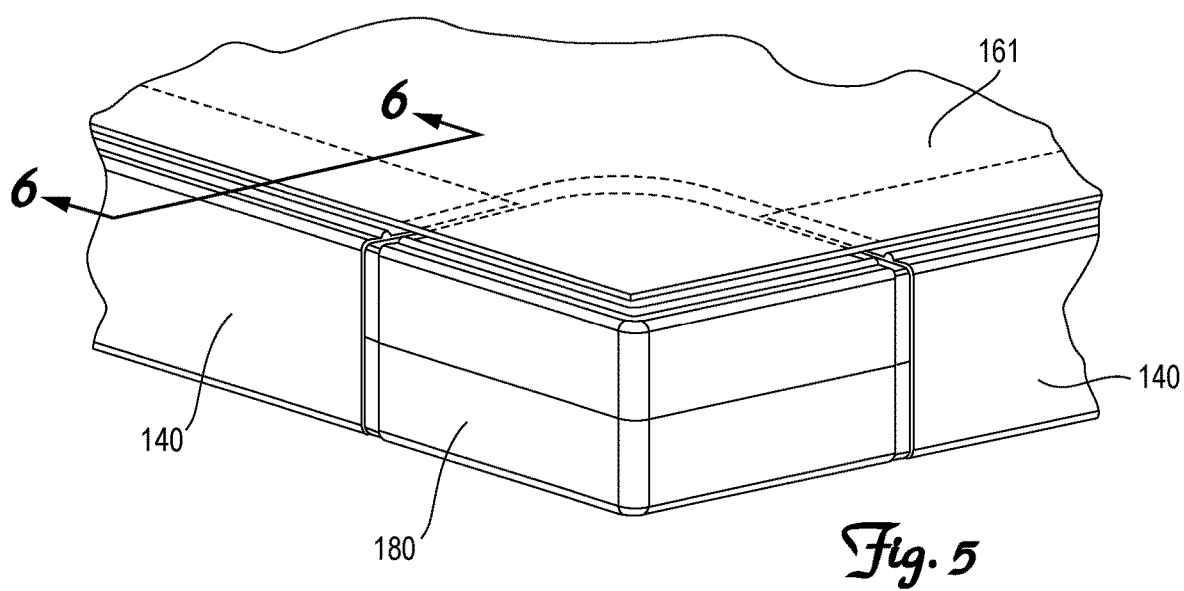

PROTECTIVELY FRAMED AND COVERED THERMAL INSULATION PANEL

BACKGROUND

Goods such as medical supplies, blood, and vaccines are often extremely temperature sensitive and need to be maintained within a given temperature range. Transport is particularly challenging. Such temperature sensitive goods are shipped to a variety of destinations where the ambient outside temperature varies from extreme cold to extreme heat.

In the prior art, shipment of temperature controlled supplies has been at least partially achieved by shipping containers lined with six separate vacuum insulation panels forming a container for the temperature sensitive goods. Vacuum insulated panels are extremely effective insulators as long as the internal vacuum remains intact. However, once the external barrier of the panels is breached and the vacuum ceases to exist, the thermal performance of the panels is reduced. The gas resistant outer film of the panel which seals the internal vacuum provides little protection. Therefore, a need exists for an assembly of vacuum insulated panels which have a greater abrasion and impact resistance.

SUMMARY OF THE INVENTION

The invention is directed to protectively enclosed panels of frangible thermal insulation.

A first embodiment of the invention includes (a) a panel of frangible thermal insulation, (b) a C-channel binding bar fitted over each edge of the panel of frangible thermal insulation, and (c) first and second wear protective cover sheets, wherein the first cover sheet covers the first major surface of the thermal insulation panel with the peripheral margin of the first cover sheet adhered to the C-channel binding bars, and the second cover sheet covers the second major surface of the thermal insulation panel with the peripheral margin of the second cover sheet adhered to the C-channel binding bars.

A second embodiment of the invention includes (a) a planar set of edge-abutting frangible thermal insulation panels wherein the set defines an integrated thermal insulation panel having peripheral edges, (b) a C-channel binding bar fitted over each peripheral edge of the integrated thermal insulation panel, and (c) first and second wear protective cover sheets, wherein the first cover sheet covers the first major surface of the integrated thermal insulation panel with the peripheral margin of the first cover sheet adhered to the C-channel binding bars, and the second cover sheet covers the second major surface of the integrated thermal insulation panel with the peripheral margin of the second cover sheet adhered to the C-channel binding bars.

BRIEF DESCRIPTION OF THE DRAWINGS

FIG. 3 is a perspective view of one of the C-channel binding bars depicted in FIGS. 1 and 2.

FIG. 4 is a perspective view of one of the corner protectors depicted in FIGS. 1 and 2.

FIG. 5 is a perspective view of one of the corners on the embodiments of the invention depicted in FIGS. 1 and 2.

DETAILED DESCRIPTION OF A PREFERRED EMBODIMENT

Nomenclature Table

| REF. NO. | NAME |
|---|---|
| 100 | Protectively Enclosed Frangible Thermal Insulation Panel |
| 101 | Protectively Enclosed Individual Panel of Frangible Thermal Insulation |
| 102 | Protectively Enclosed Set of Frangible Thermal Insulation Panels |
| 110 | Individual Panel of Frangible Thermal Insulation |
| 110a | First Major Surface of Individual Panel of Frangible Thermal Insulation |
| 110b | Second Major Surface of Individual Panel of Frangible Thermal Insulation |
| 110c | Corners at Edge Intersections on Individual Panel of Frangible Thermal Insulation |
| 110e | Edge of Individual Panel of Frangible Thermal Insulation |
| 120 | Integrated Set of Frangible Thermal Insulation Panels |
| 120a | First Major Surface of Integrated Set of Thermal Insulation Panels |
| 120b | Second Major Surface of Integrated Set of Thermal Insulation Panels |
| 120c | Corners at Intersections of Peripheral Edges of Integrated Set of Thermal Insulation Panels |
| 120e | Peripheral Edges of Integrated Set of Thermal Insulation Panels |
| 140 | C-channel Binding Bars |
| 140a | First Leg of C-channel Binding Bar |
| 140b | Second Leg of C-channel Binding Bar |
| 150 | Adhesive Layer |
| 160 | Wear Protective Cover Sheets (collective reference) |
| 161 | First Wear Protective Cover Sheet |
| 161p | Peripheral Margin of First Wear Protective Cover Sheet |
| 162 | Second Wear Protective Cover Sheet |
| 162p | Peripheral Margin of Second Wear Protective Cover Sheet |
| 180 | Corner Protector |
| 181 | Flange on Corner Protector |

We have discovered that the useful life of rigid thermal insulation, particularly and hereinafter referenced as a vacuum insulated panel 110 can be significantly increased by reducing abrasive and impact wear of the rigid thermal insulation, such as experienced by the airtight outer film (not individually numbered) on vacuum insulated panels 110.

Construction

Figure 1:
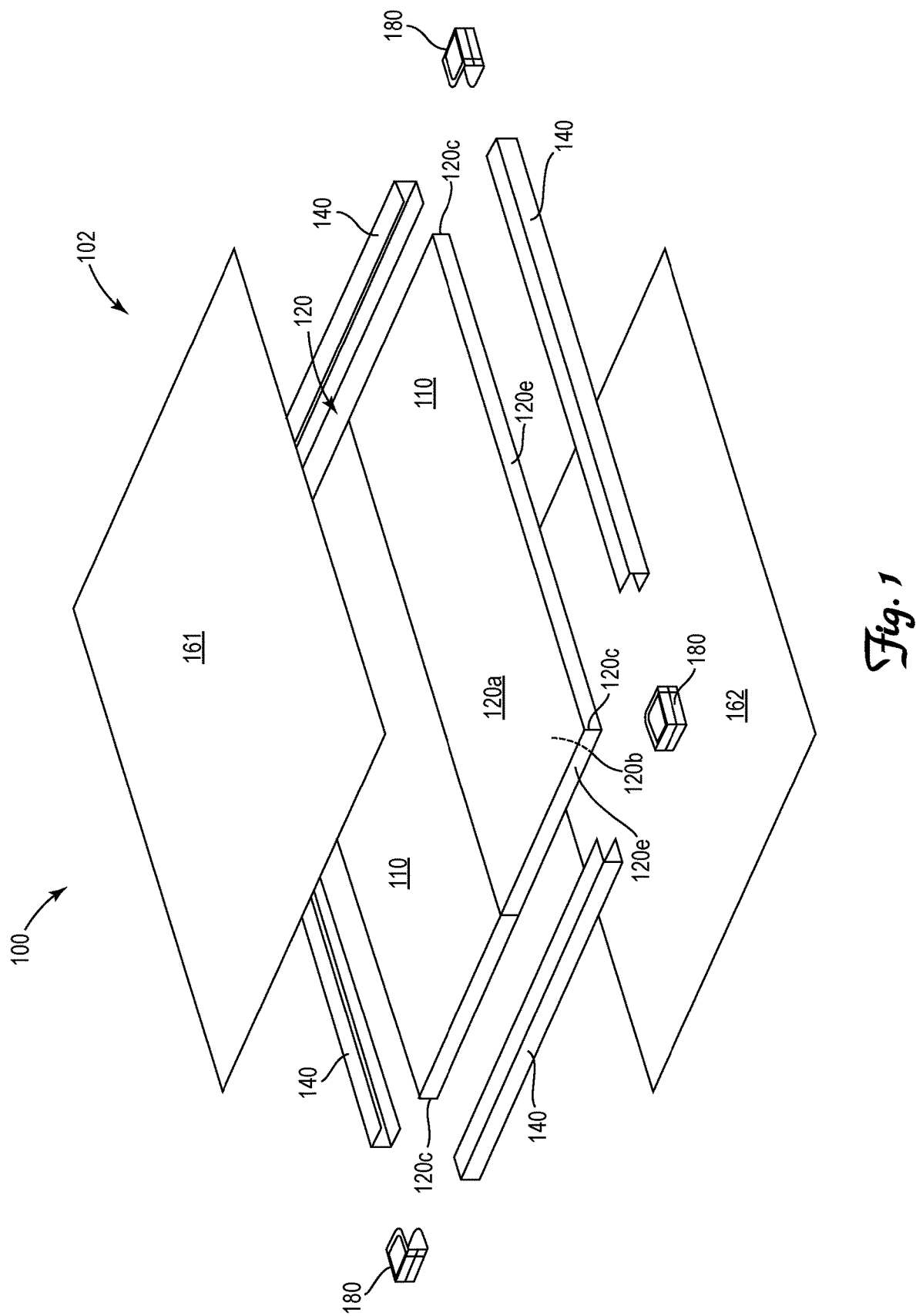
FIG. 1 is an exploded perspective view of one embodiment of the invention.
Figure 2:
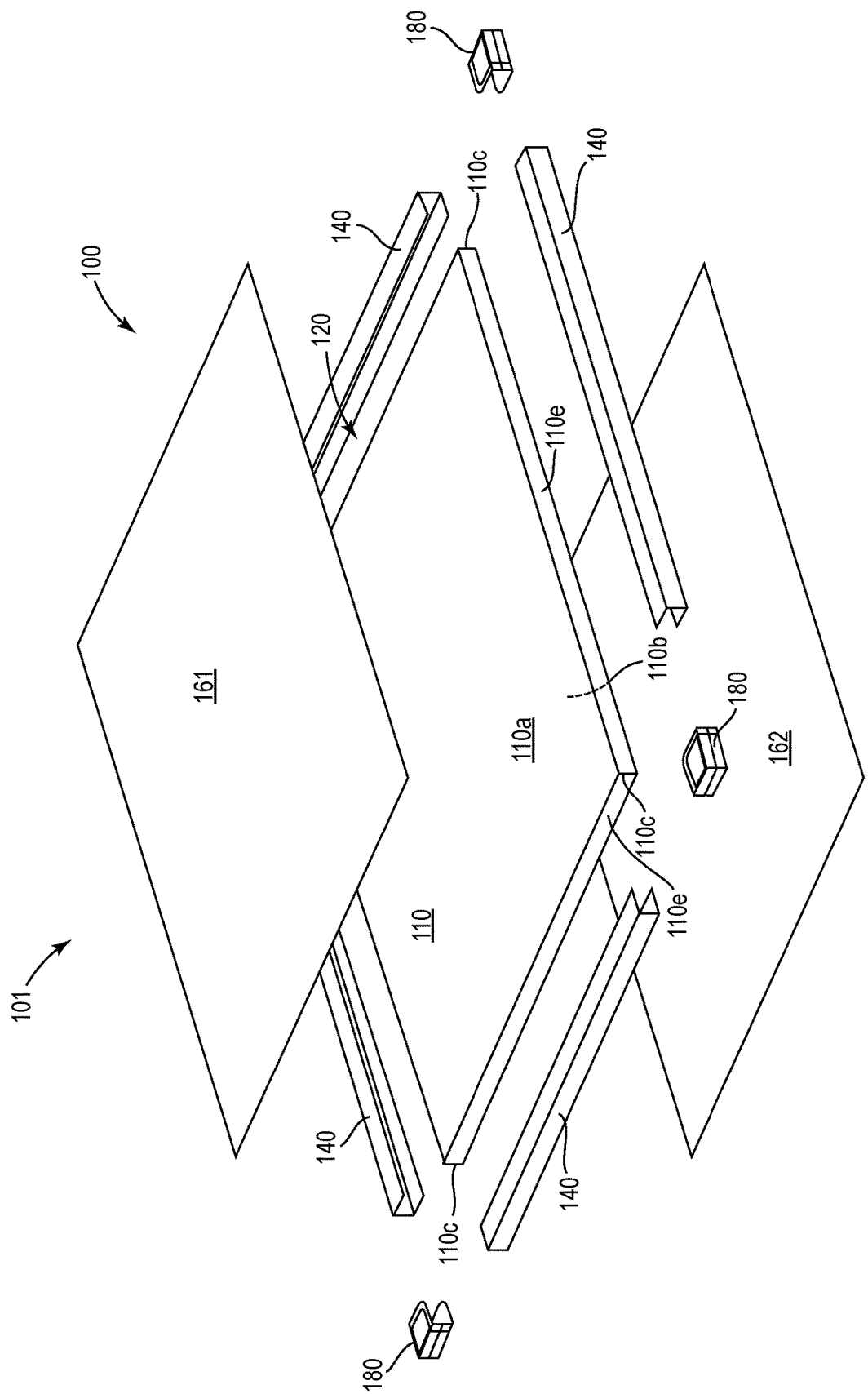
FIG. 2 is an exploded perspective view of a second embodiment of the invention.

Referring to FIGS. 1 and 2, the invention is directed to a wear-protected rigid thermal insulation panel 100 particularly suited for use in assembly of an insulated container (not shown) such as those shown and described in U.S. Pat. Nos. 4,145,895; 4,579,170; 4,923,077; 4,931,333; 5,626,936; 5,899,088; 6,209,343; 6,718,776; 7,257,963; 7,422,143; 7,500,593 and 8,424,335, and United States Patent Application Publications 2002/0050147; 2005/0188714; 2011/0248038; and 2013/0228583, hereby incorporated by reference.

Referring to FIG. 1, a first embodiment of the wear-protected frangible thermal insulation panel 100 is a wear-protected frangible thermal insulation panel 101 that includes a single frangible thermal insulation panel 110, such as a vacuum insulated panel, a C-channel binding bar 140 for covering each edge 110e of the frangible thermal insulation panel 110, a coating of pressure-sensitive adhesive 150 on both the first 140a and second 140b legs of each C-channel binding bar 140, and a paired set of a first 161 and a second 162 wear-protective cover sheets (collectively 160).

Referring to FIG. 2, a second embodiment of the wear-protected frangible thermal insulation panel 100 is a wear-protected set of frangible thermal insulation panels 102 that includes a plurality of frangible thermal insulation panels 110, such as vacuum insulated panels, forming an integrated set of frangible thermal insulation panels 120, a C-channel binding bar 140 for covering each peripheral edge 120e of the integrated set of frangible thermal insulation panels 120, a coating of pressure-sensitive adhesive 150 on both the first 140a and second 140b legs of each C-channel binding bar 140, and a paired set of a first 161 and a second 162 wear-protective cover sheets (collectively 160). The C-channel binding bars 140 and cover sheets 160 used in this second embodiment provide not only wear-protection but also conformational stability.

Frangible thermal insulation panels 110 suitable for use include any of the well-known and widely used frangible thermal insulation materials available and deployed as rigid panels, such as sheets of foamed polystyrene and vacuum insulated panels. Each of the frangible thermal insulation panels 110 have a first major surface 110a, an opposed second major surface 110b, edges 110e, and corners 110c at the intersection of each pair of edges 110e.

The invention is particularly suited for wear-protection of vacuum insulated panels (VIPs). VIPs are a technologically advanced insulation product consisting of a cell foam core material surrounded by a gas tight outer film to which a vacuum has been applied. VIPs are highly efficient thermal insulators so long as the integrity of the vacuum is not compromised. Once the vacuum is lost, the panel provides modest insulating value at best. VIPs suffer from a frequent loss of vacuum, with concomitant loss of insulating value, due to the fragile nature of the gas tight outer film.

Referring to FIG. 3, the C-channel binding bars 140 are linearly elongated C-channels constructed from any structurally rigid yet slightly elastic material such as aluminum, polyethylene, polypropylene, polyurethane, nylon, etc. The C-channel binding bar 140 should be sufficiently flexible to allow the legs 140a and 140b of the bar 140 to readily flex a distance away from one another so as to allow slide fitting of the C-channel binding bars 140 over the edges 110e of a frangible thermal insulation panel 110 without damaging the panel 110, but with sufficient elasticity to effect an interference fit of the C-channel binding bars 140 to the frangible thermal insulation panel 110 once fitted. The C-channel binding bars 140 should have a length sufficient to cover the entire length of a corresponding edge on the frangible thermal insulation panel 110.

Referring to FIG. 4, corner protectors 180 may optionally be included for protectively covering the corners 110c of the frangible thermal insulation panel 110. The corner protectors 180 are preferably constructed from the same material as the C-channel binding bars 140, and preferably include a peripheral flange 181 for facilitation overlapping engagement of the C-channel binding bars 140 with the corner protectors 180.

Figure 6:
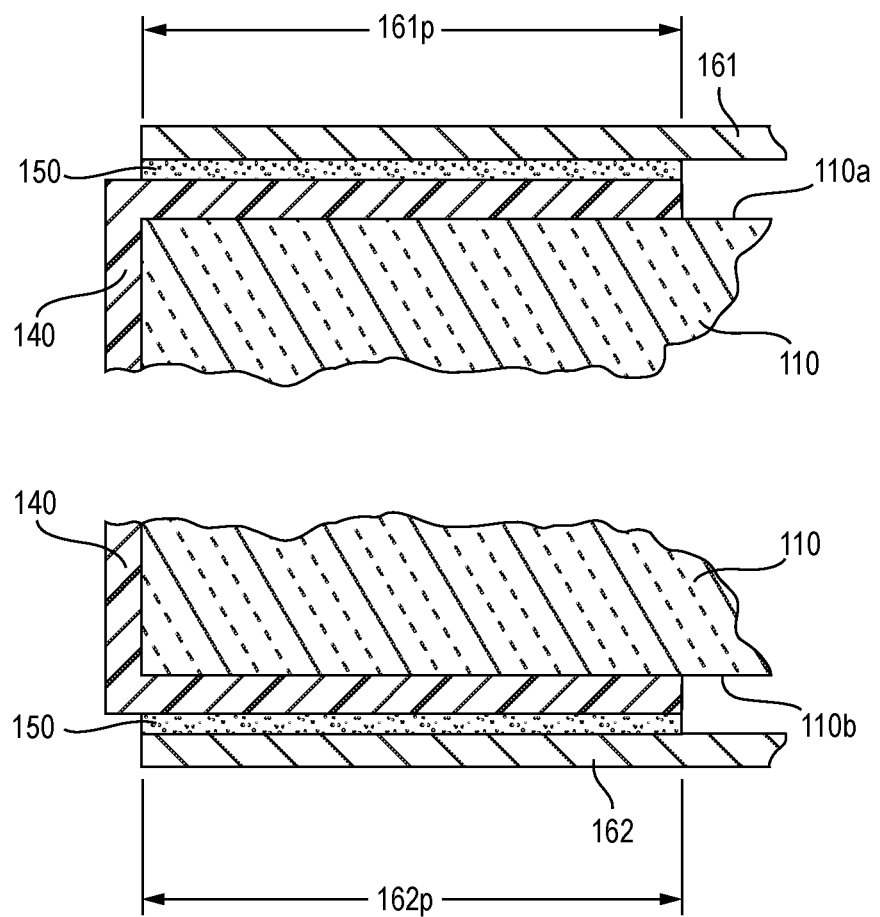
FIG. 6 is an enlarged cross-sectional view of the top and bottom edge portions of the invention depicted in FIG. 5 taken along line 6-6.

Referring to FIGS. 1 and 2, the cover sheets 160 may be pliable in a direction normal to the plane of the sheet, but should provide dimensional stability within the plane of the sheet, and be abrasion and puncture resistant. Suitable materials include specifically but not exclusively, sheet metal such as aluminum or steel, plastics such a polycarbonate, polyvinyl chloride, polypropylene and polyethylene, and paper such as card stock, with a preference for plastics. Referring to FIGS. 5 and 6, the peripheral margins 161p of a first cover sheet 161 are adhered to the first legs 140a of the C-channel binding bars 140 fitted onto the frangible thermal insulation panel 110, and adhered to any corner protectors fitted onto the frangible thermal insulation panel 110 by an adhesive layer 150. In similar fashion the peripheral margins 162p of a second cover sheet 162 are adhered to the second legs 140b of the C-channel binding bars 140 fitted onto the frangible thermal insulation panel 110, and adhered to any corner protectors fitted onto the frangible thermal insulation panel 110 by an adhesive layer 150. The adhesive layers 150 are preferably a coating of a pressure sensitive adhesive or a layer of double-sided adhesive tape.

Referring to FIG. 2, the embodiment 102 that includes a set of frangible thermal insulation panels 110 is constructed in a fashion very similar to the embodiment 101 having a single frangible thermal insulation panel 110. The major distinctions are that the set of frangible thermal insulation panels 110 form an integrated set 120 that defines a first major surface 120a and a second major surface 120b of the integrated set 120, and only the peripheral edges 120e and corners 120c of the integrated set 120, rather than all of the edges and corners of each individual frangible thermal insulation panel 110, are covered by C-channel binding bars 140 and corner protectors 180.

I claim:

1. A protectively enclosed panel of frangible thermal insulation, comprising an assembly of separately and independently formed components that include at least:
   (a) a panel of frangible thermal insulation having first and second major surfaces and a plurality of edges,
   (b) a C-channel binding bar interference fitted over each of the edges, with each C-channel having an interior surface facing towards and in physical contact with the panel of frangible thermal insulation and an exterior surface facing away from the panel of frangible thermal insulation, and
   (c) first and second wear protective cover sheets each with a peripheral margin, wherein:
      (i) the first cover sheet covers the first major surface of the thermal insulation panel with the peripheral margin of the first cover sheet adhered to the exterior surface of the C-channel binding bars, and
      (ii) the second cover sheet covers the second major surface of the thermal insulation panel with the peripheral margin of the second cover sheet adhered to the exterior surface of the C-channel binding bars.

2. The protectively enclosed panel of frangible thermal insulation of claim 1, wherein the panel of frangible thermal insulation has a corner at the intersection of each pair of edges, and the protectively enclosed panel of frangible thermal insulation further includes wear protective corner protectors over each corner with each corner protector in overlapping engagement with the C-channel binding bars fitted over the intersecting edges and adhered to at least one of the first and second impact protective cover sheets.

3. The protectively enclosed panel of frangible thermal insulation of claim 1, wherein the panel of frangible thermal insulation is a vacuum insulated panel comprising a core material sealingly wrapped under vacuum within a gas resistant film.

4. A protectively enclosed set of frangible thermal insulation panels, comprising:
   (a) a planar set of separately and independently formed, edge-abutting frangible thermal insulation panels wherein the set defines an integrated thermal insulation panel having first and second major surfaces and a plurality of peripheral edges,
   (b) a C-channel binding bar interference fitted over each of the peripheral edges of the integrated thermal insulation panel with each C-channel having an interior surface facing towards and in physical contact with the integrated thermal insulation panel and an exterior surface facing away from the integrated thermal insulation panel, and
(c) first and second wear protective cover sheets each with a peripheral margin, wherein:
(i) the first cover sheet covers the first major surface of the integrated thermal insulation panel with the peripheral margin of the first cover sheet adhered to the exterior surface of the C-channel binding bars, and
(ii) the second cover sheet covers the second major surface of the integrated thermal insulation panel with the peripheral margin of the second cover sheet adhered to the exterior surface of the C-channel binding bars.

5. The protectively enclosed set of frangible thermal insulation panels of claim 4, wherein the set of frangible thermal insulation panels comprises at least two vacuum insulation panels.

6. The protectively enclosed set of frangible thermal insulation panels of claim 4, wherein the set of frangible thermal insulation panels comprises at least three thermal insulation panels.

7. The protectively enclosed set of frangible thermal insulation panels of claim 4, wherein the integrated thermal insulation panel has a corner at the intersection of each pair of peripheral edges, and the protectively enclosed set of frangible thermal insulation panels further includes wear protective corner protectors over each corner with each corner protector in overlapping engagement with the C-channel binding bars fitted over the intersecting peripheral edges and adhered to at least one of the first and second wear protective cover sheets.

8. The protectively enclosed set of frangible thermal insulation panels of claim 4, wherein each panel of frangible thermal insulation, each C-channel binding bar, and the first and second cover sheets are formed as separate and independent components.

9. A kit comprising several separate and independent components from which a protectively enclosed panel of frangible thermal insulation may be assembled, the components including at least:
(a) a panel of frangible thermal insulation having (i) a first major surface that includes a peripheral margin and a central area bounded by the peripheral margin, (ii) a second major surface that includes a peripheral margin and a central area bounded by the peripheral margin, and (iii) a plurality of edges,
(b) a plurality of C-channel binding bars, each having an interior surface and an exterior surface and configured and arranged for interference fitted engagement over one of the plurality of edges of the panel of frangible thermal insulation with the interior surface facing towards and in physical contact with the panel of frangible thermal insulation and the exterior surface facing away from the panel of frangible thermal insulation so as to cover the peripheral margins of the first major surface and the second major surface of the panel, and
(c) first and second wear protective cover sheets each having side edges, wherein:
(i) the first cover sheet is operable for completely covering the central area and extending a distance on all side edges into the peripheral margin of the first major surface of the thermal insulation panel, and
(ii) the second cover sheet is operable for completely covering the central area and extending a distance on all side edges into the peripheral margin of the second major surface of the thermal insulation panel, and
(d) further including:
(i) a first layer of pressure sensitive adhesive operable for adhering a peripheral margin of the first cover sheet to the exterior surface of each C-channel binding bar when the bars are installed over the edges of the panel of frangible thermal insulation, with the first layer of pressure sensitive adhesive provided on the first cover sheet, the C-channel binding bars or as a separate and independent component, and
(ii) a second layer of pressure sensitive adhesive operable for adhering a peripheral margin of the second cover sheet to the exterior surface of each C-channel binding bar when the bars are installed over the edges of the panel of frangible thermal insulation, with the second layer of pressure sensitive adhesive provided on the second cover sheet, the C-channel binding bars or as a separate and independent component.

10. The kit of claim 9, wherein the panel of frangible thermal insulation has a corner at the intersection of each pair of edges, and the kit further includes a plurality of wear protective corner protectors configured and arranged for engagement over each corner of the panel of frangible thermal insulation in overlapping arrangement with C-channel binding bars installed onto the panel.

11. The kit of claim 9, wherein the panel of frangible thermal insulation is a vacuum insulated panel comprising a core material sealingly wrapped under vacuum within a gas resistant film.

12. A kit comprising several separate and independent components from which a protectively enclosed set of frangible thermal insulation panels may be assembled, the components including at least:
(a) a set of at least two separately and independently formed frangible thermal insulation panels capable of forming an integrated thermal insulation panel when placed in a planar edge-abutting arrangement, whereby an integrated thermal insulation panel formed from the set of at least two frangible thermal insulation panels defines (i) a first major surface that includes a peripheral margin and a central area bounded by the peripheral margin, (ii) a second major surface that includes a peripheral margin and a central area bounded by the peripheral margin, and (iii) a plurality of edges,
(b) a plurality of C-channel binding bars, each having an interior surface and an exterior surface and configured and arranged for interference fitted engagement over one of the plurality of edges of the integrated thermal insulation panel with the interior surface facing towards and in physical contact with the integrated thermal insulation panel and the exterior surface facing away from the integrated thermal insulation panel so as to cover the peripheral margins of the first major surface and the second major surface of the integrated panel, and
(c) first and second wear protective cover sheets each having side edges, wherein:
(i) the first cover sheet is operable for completely covering the central area and extending a distance on all side edges into the peripheral margin of the first major surface of the integrated thermal insulation panel, and (ii) the second cover sheet is operable for completely covering the central area and extending a distance on all side edges into the peripheral margin of the second major surface of the integrated thermal insulation panel, and (d) further including:

(i) a first layer of pressure sensitive adhesive operable for adhering a peripheral margin of the first cover sheet to the exterior surface of each C-channel binding bar when the bars are installed over the edges of the integrated thermal insulation panel, with the first layer of pressure sensitive adhesive provided on the first cover sheet, the C-channel binding bars or as a separate and independent component, and (ii) a second layer of pressure sensitive adhesive operable for adhering a peripheral margin of the second cover sheet to the exterior surface of each C-channel binding bar when the bars are installed over the edges of the integrated thermal insulation panel, with the second layer of pressure sensitive adhesive provided on the second cover sheet, the C-channel binding bars or as a separate and independent component.

13. The kit of claim 12, wherein the frangible thermal insulation panels comprise vacuum insulation panels.

14. The kit of claim 12, wherein the set of frangible thermal insulation panels comprises at least three vacuum insulation panels.

* * * * *